(12) United States Patent
Katsurada et al.

(10) Patent No.: US 12,325,350 B2
(45) Date of Patent: Jun. 10, 2025

(54) VEHICULAR LAMP

(71) Applicants: KOITO MANUFACTURING CO., LTD., Tokyo (JP); TOYOTA JIDOSHA KABUSHIKI KAISHA, Toyota (JP)

(72) Inventors: Yoshihiro Katsurada, Shizuoka (JP); Kenji Furumoto, Toyota (JP); Eisuke Ikeno, Toyota (JP)

(73) Assignees: KOITO MANUFACTURING CO., LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/701,476

(22) PCT Filed: Oct. 19, 2022

(86) PCT No.: PCT/JP2022/038999
§ 371 (c)(1),
(2) Date: Apr. 15, 2024

(87) PCT Pub. No.: WO2023/079963
PCT Pub. Date: May 11, 2023

(65) Prior Publication Data
US 2025/0058697 A1    Feb. 20, 2025

(30) Foreign Application Priority Data
Nov. 5, 2021    (JP) ................. 2021-181494

(51) Int. Cl.
*B60Q 1/00*       (2006.01)
*F21S 41/20*      (2018.01)
(Continued)

(52) U.S. Cl.
CPC ........ *B60Q 1/0023* (2013.01); *F21S 41/2805* (2024.05); *G01S 7/027* (2021.05);
(Continued)

(58) Field of Classification Search
CPC .......... G01S 13/931; G01S 7/03; G01S 7/027; F21S 41/2805; B60Q 1/0023
See application file for complete search history.

(56) References Cited

U.S. PATENT DOCUMENTS

2017/0158111 A1    6/2017  Zawacki et al.
2022/0340072 A1*  10/2022  Mori ...................... G01S 7/027
(Continued)

FOREIGN PATENT DOCUMENTS

| JP | 2019-52953 A | 4/2019 |
| JP | 2021-25849 A | 2/2021 |
| JP | 2021-91303 A | 6/2021 |

OTHER PUBLICATIONS

International Search Report (PCT/ISA/210) dated Nov. 29, 2022, issued by the International Searching Authority in International Application No. PCT/JP2022/038999.
(Continued)

*Primary Examiner* — Christopher E Dunay
(74) *Attorney, Agent, or Firm* — Sughrue Mion, PLLC

(57) ABSTRACT

A vehicle lamp in which a millimeter wave radar is disposed on an outer surface side of an outer lens covering a lamp chamber. The vehicle lamp includes: a holding bracket configured to hold the millimeter wave radar; and a radar cover configured to cover the millimeter wave radar. The holding bracket is fixed to the outer lens in a state of holding the millimeter wave radar, and the radar cover is fixed to the holding bracket in a state of covering the millimeter wave radar.

6 Claims, 8 Drawing Sheets

(51) Int. Cl.
G01S 7/02 (2006.01)
G01S 7/03 (2006.01)
G01S 13/931 (2020.01)

(52) U.S. Cl.
CPC .............. G01S 7/03 (2013.01); G01S 13/931 (2013.01); *G01S 2013/93277* (2020.01)

(56) References Cited

U.S. PATENT DOCUMENTS

| | | | | |
|---|---|---|---|---|
| 2023/0062751 | A1* | 3/2023 | Katsurada | F21S 43/37 |
| 2023/0266435 | A1* | 8/2023 | Nakayama | B60Q 1/0041 |
| | | | | 342/52 |
| 2024/0025332 | A1* | 1/2024 | Mitomo | F21S 41/20 |
| 2024/0025333 | A1* | 1/2024 | Tanaka | H01Q 1/3233 |

OTHER PUBLICATIONS

Written Opinion (PCT/ISA/237) dated Nov. 29, 2022, issued by the International Searching Authority in International Application No. PCT/JP2022/038999.

* cited by examiner

VEHICULAR LAMP

CROSS-REFERENCE TO RELATED APPLICATIONS

This application is a National Phase Entry of PCT International Application No. PCT/JP2022/038999 filed on Oct. 19, 2022, which claims priority to Japanese Patent Application No. 2021-181494 filed on Nov. 5, 2021, the contents of which are incorporated herein by reference in their entirety.

TECHNICAL FIELD

The present disclosure relates to a vehicular lamp, also called as a vehicle lamp, in which a millimeter wave radar is disposed.

BACKGROUND ART

In the related art, there has been known a configuration of a vehicular lamp, also called as a vehicle lamp, in which a millimeter wave radar is disposed.

Patent Literature 1 discloses a configuration in which a millimeter wave radar is disposed on an outer surface side of an outer lens covering a lamp chamber of such a vehicle lamp, and the millimeter wave radar is covered with a radar cover.

CITATION LIST

Patent Literature

Patent Literature 1: JP2021-91303A

SUMMARY OF INVENTION

Technical Problem

In the vehicular lamp (the vehicle lamp) disclosed in Patent Literature 1, a structure for fixing the millimeter wave radar and the radar cover to the outer lens is required, but from the viewpoint of ensuring molding quality of the outer lens, it is desirable to prevent the outer lens from having a complicated shape.

The invention has been made in view of the above circumstances, and an object of the invention is to provide a vehicle lamp. In the vehicle lamp, a millimeter wave radar is disposed, the millimeter wave radar and a radar cover can be fixed to an outer lens without the outer lens having a complicated shape.

Solution To Problem

The invention is intended to achieve the above object by providing a predetermined holding bracket.

That is, a vehicle lamp according to the invention is a vehicle lamp in which a millimeter wave radar is disposed on an outer surface side of an outer lens covering a lamp chamber, and includes:
 a holding bracket configured to hold the millimeter wave radar; and
 a radar cover configured to cover the millimeter wave radar, wherein
 the holding bracket is fixed to the outer lens in a state of holding the millimeter wave radar, and
 the radar cover is fixed to the holding bracket in a state of covering the millimeter wave radar.

A specific arrangement of the "millimeter wave radar" is not particularly limited as long as the "millimeter wave radar" is disposed on the outer surface side of the outer lens.

A specific arrangement, shape, and the like of the "holding bracket" are not particularly limited as long as the "holding bracket" is capable of holding the millimeter wave radar. A specific fixing structure for the outer lens is not particularly limited.

A specific arrangement, shape, and the like of the "radar cover" are not particularly limited, and a specific fixing structure for the holding bracket is not particularly limited. In this case, the "radar cover" may be disposed so as to cover the entire millimeter wave radar or may be disposed so as to cover a part of the millimeter wave radar as long as the "radar cover" is disposed in a state in which the millimeter wave radar cannot be visually recognized from an outside of the vehicle lamp.

ADVANTAGEOUS EFFECTS OF INVENTION

According to the invention, since the holding bracket is fixed to the outer lens and the radar cover is fixed to the holding bracket, it is not necessary to provide the outer lens with a structure for fixing the millimeter wave radar and the radar cover, and accordingly the outer lens can be prevented from having a complicated shape. Accordingly, it is possible to more easily ensure molding quality of the outer lens.

DESCRIPTION OF EMBODIMENTS

Hereinafter, an embodiment of the invention will be described with reference to the drawings.

Figure 1:
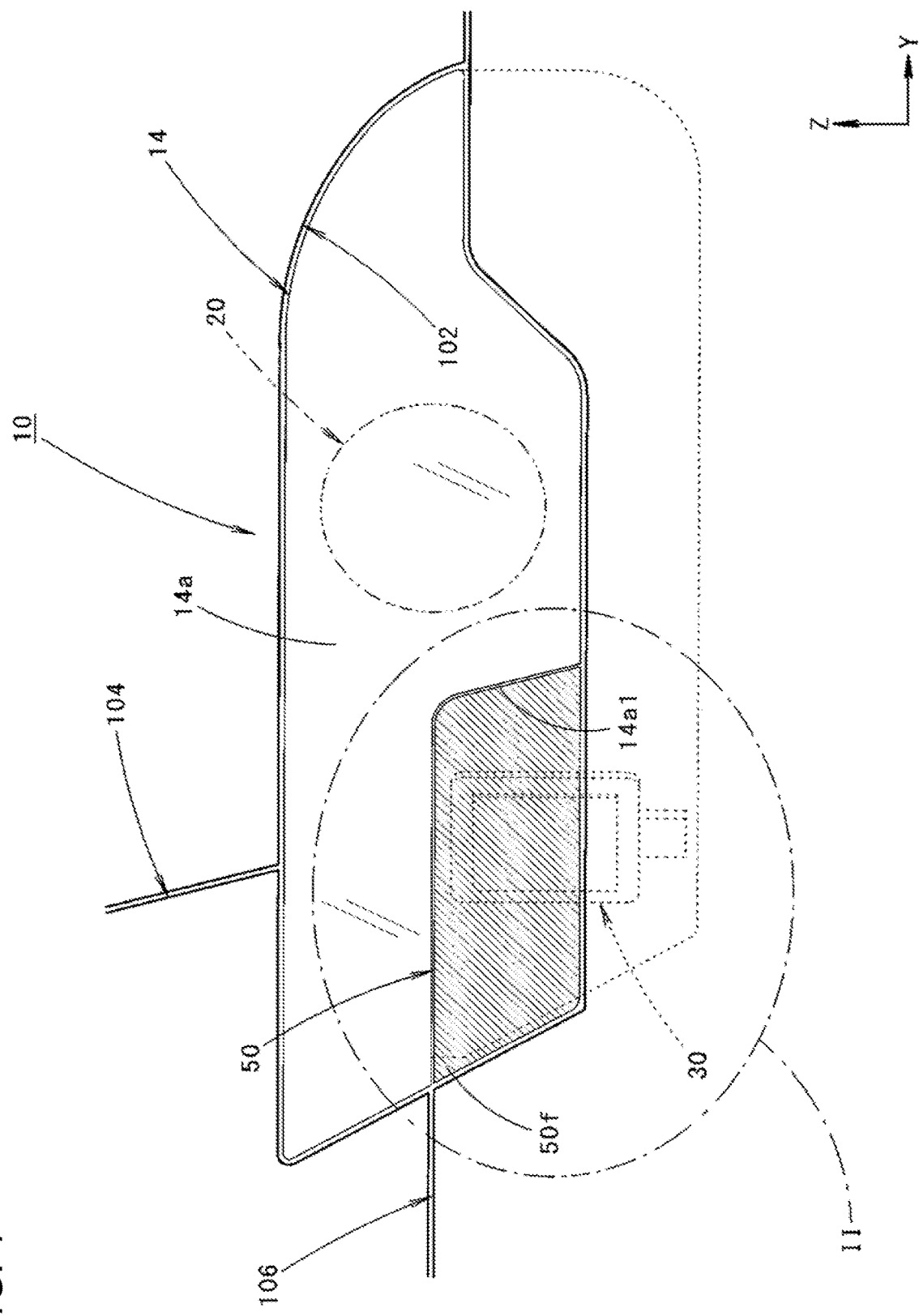
FIG. 1 is a front view illustrating a vehicle lamp according to an embodiment of the invention in a state of being mounted on a vehicle.
Figure 2:
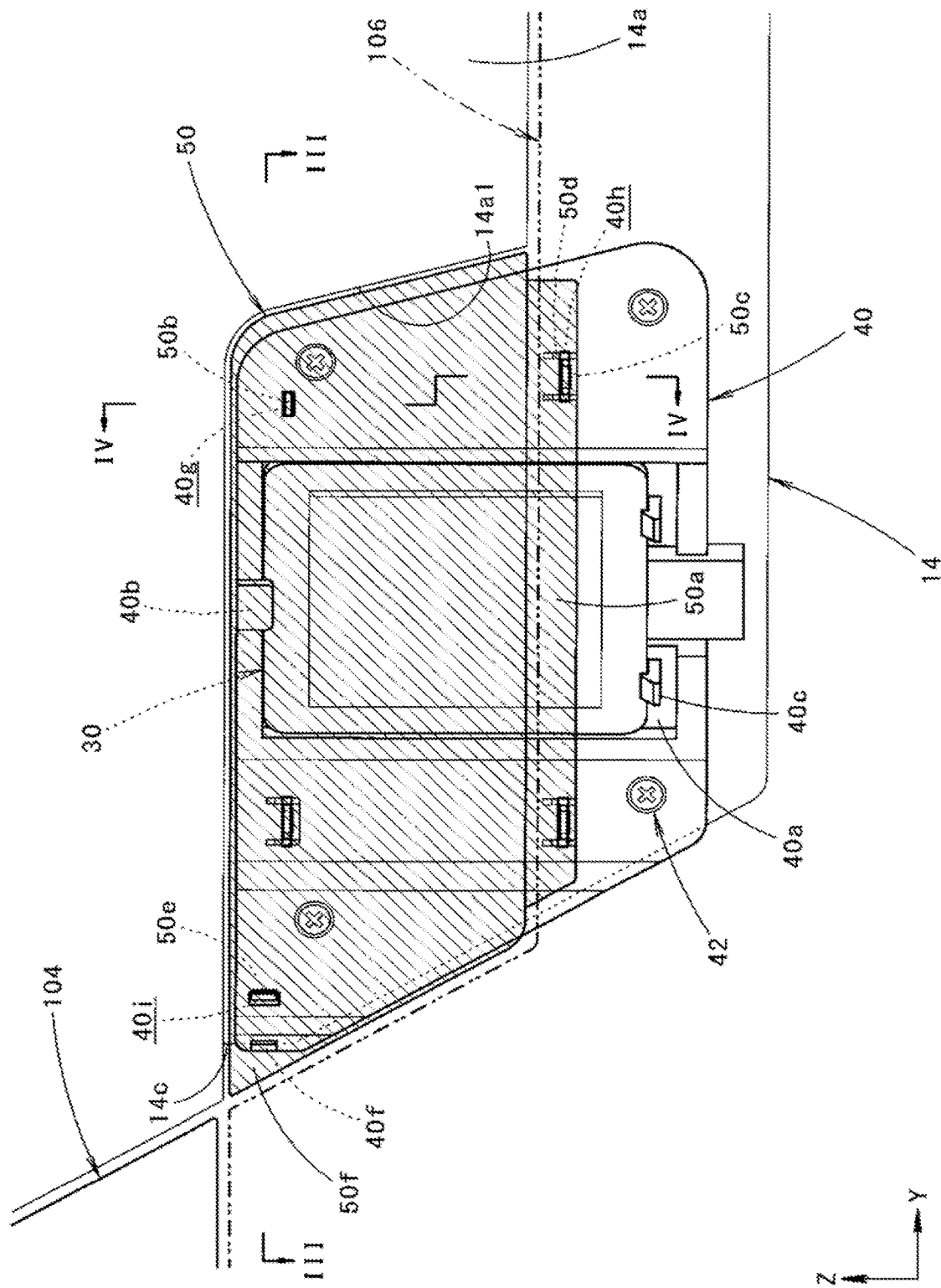
FIG. 2 is a detailed diagram of a portion II in FIG. 1.
Figure 3:
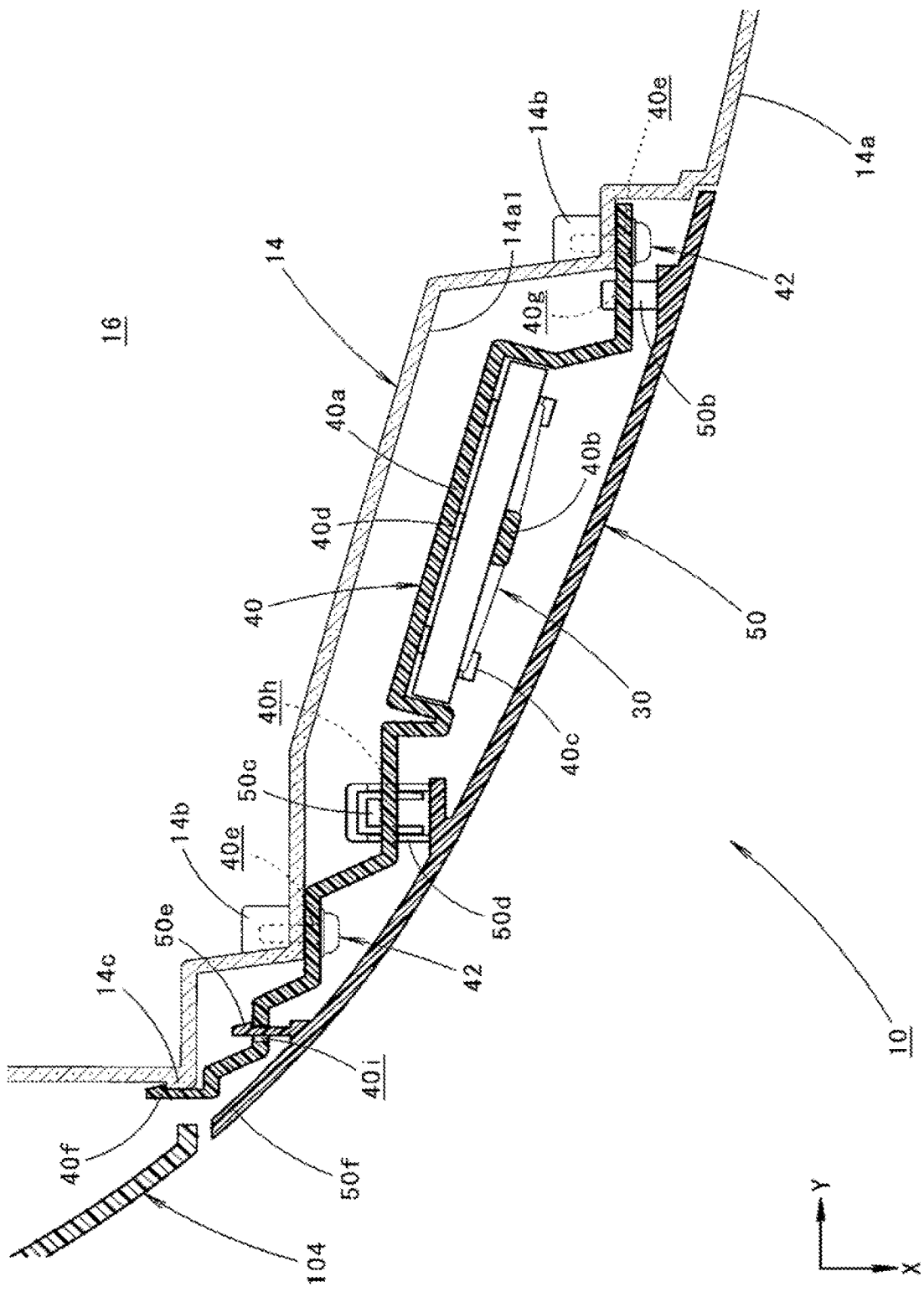
FIG. 3 is a cross-sectional view taken along a line III-III in FIG. 2.
Figure 4:
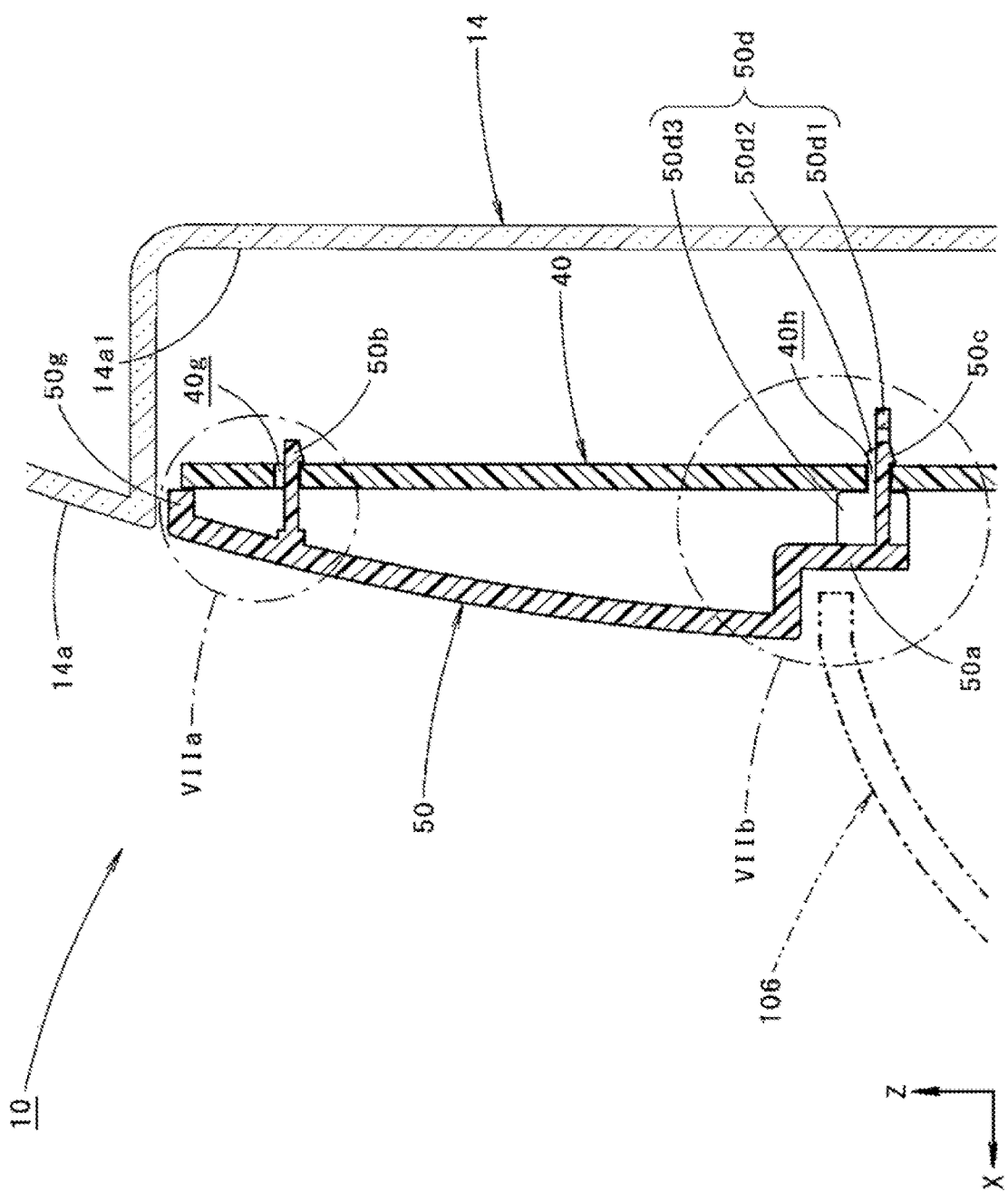
FIG. 4 is a sectional view taken along line IV-IV in FIG. 2.

FIG. 1 is a front view illustrating a vehicle lamp 10 according to the embodiment of the invention in a state of being mounted on a vehicle, and FIG. 2 is a detailed diagram of a portion II in FIG. 1. Further, FIG. 3 is a cross-sectional view taken along a line III-III in FIG. 2, and FIG. 4 is a cross-sectional view taken along a line IV-IV in FIG. 2.

In the drawings, a direction indicated by X is "the front of the lamp" (and "the front of the vehicle"), a direction indicated by Y is a "left direction" (a "right direction" in a front view of the lamp) orthogonal to "the front of the lamp", and a direction indicated by Z is an "upward direction". The same applies to figures other than FIGS. 1 to 3.

As illustrated in FIGS. 1 to 4, the vehicle lamp 10 is a headlamp provided in a right front end portion of the vehicle, and has a configuration in which a lamp unit 20 is accommodated in a lamp chamber 16 formed by a lamp body (not illustrated) and an outer lens 14. The vehicle lamp 10 is formed such that a millimeter wave radar 30 is disposed on an outer surface 14*a* side of the outer lens 14 covering the lamp chamber 16 from a front side of the lamp. A vehicle lamp (not illustrated) provided at a left front end portion of the vehicle has substantially the same configuration as the vehicle lamp 10.

As illustrated in FIG. 1, a hood 102, a fender 104, and a bumper cover 106 are disposed around the vehicle lamp 10. The hood 102 is disposed at a position on an upper side of the vehicle lamp 10 and on an inner side in a vehicle width direction, and is formed so as to wrap around to an intermediate position of an inner side portion of the vehicle lamp 10 in the vehicle width direction. The fender 104 is formed on an outer side of the hood 102 in the vehicle width direction so as to wrap around to an intermediate position of an outer side portion of the vehicle lamp 10 in the vehicle width direction. The bumper cover 106 is formed on a lower side of the vehicle lamp 10 so as to wrap around to the intermediate positions of the inner side portion in the vehicle width direction and the outer side portion of the vehicle lamp 10 in the vehicle width direction.

The outer lens 14 is formed so as to wrap around to a rear side of the lamp from an inner side in the vehicle width direction toward an outer side in the vehicle width direction, and the outer surface 14*a* thereof is formed so as to extend to be flush with outer surfaces of the hood 102 and the fender 104.

The outer lens 14 has a horizontally long outer shape in the front view of the lamp, and a lower region thereof is covered with the bumper cover 106 in a state of being formed so as to be positioned on the rear side of the lamp with respect to the bumper cover 106.

The outer surface 14*a* of the outer lens 14 is formed such that a lower right corner portion (a lower left corner portion in the front view of the lamp) thereof is a recess portion 14*a*1 which is recessed toward the rear side of the lamp with respect to other general regions. The recess portion 14*a*1 is formed continuously with an outer surface of the lower region of the outer lens 14. The millimeter wave radar 30 is disposed in a state in which a substantially upper half portion thereof is accommodated in the recess portion 14*a*1.

The millimeter wave radar 30 is disposed in a state of facing slightly outward in the vehicle width direction with respect to a vehicle front direction, and detects an obstacle such as a preceding vehicle or a road surface falling object by emitting millimeter waves (for example, millimeter waves of about 77 Hz) toward the front of the vehicle. As a result, collision of the vehicle can be avoided and impacts at the time of the collision can be reduced.

As illustrated in FIGS. 2 to 4, the vehicle lamp 10 includes a holding bracket 40 for holding the millimeter wave radar 30 and a radar cover 50 for covering the millimeter wave radar 30.

The holding bracket 40 is fixed to the outer lens 14 in a state of holding the millimeter wave radar 30. The radar cover 50 is fixed to the holding bracket 40 in a state of covering most of the millimeter wave radar 30 (that is, a portion other than a lower end portion).

The radar cover 50 is formed such that an outer surface thereof extends to be flush with the outer surface 14*a* of the outer lens 14. An outer surface of an outer peripheral edge portion 50*f* of the radar cover 50 on the outside in the vehicle width direction extends to be flush with the bumper cover 106. However, a lower region 50*a* of the radar cover 50 is formed to extend in a band shape in the vehicle width direction in a state of being displaced to the rear side of the lamp with respect to the other general regions, and is covered with the bumper cover 106.

As illustrated in FIG. 1, the radar cover 50 has a substantially parallel quadrilateral outer shape in the front view of the lamp, and the outer peripheral edge portion 50*f* on the outer side in the vehicle width direction is formed to extend outward in the vehicle width direction and obliquely upward and rearward at an acute angle. An upper end edge of the radar cover 50 extends in the vehicle width direction at substantially the same height as an upper end edge of the bumper cover 106.

The outer lens 14 is made of a colorless and transparent resin molded product. On the other hand, the radar cover 50 and the holding bracket 40 are made of a non-transparent (for example, black) resin molded product. Note that the radar cover 50 is illustrated in a state of being hatched in the front view of the lamp in order to facilitate understanding of an arrangement of the radar cover 50.

Next, a mounting structure of the millimeter wave radar 30 and mounting structures of the holding bracket 40 the radar cover 50 will be described.

Figure 5:
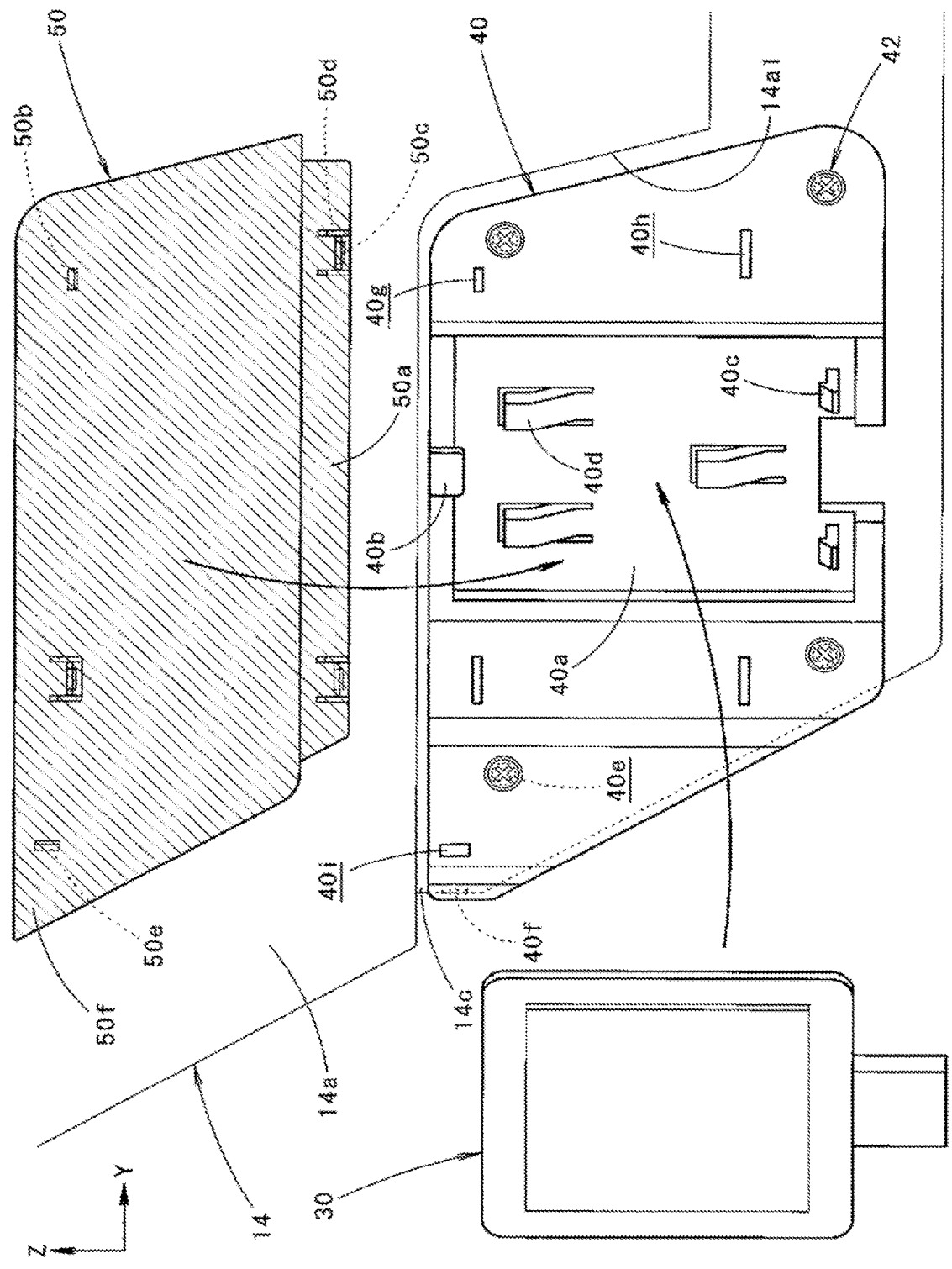
FIG. 5 is a diagram, similar to FIG. 2, that illustrates a state of assembly of essential parts of the vehicle lamp.
Figure 6:
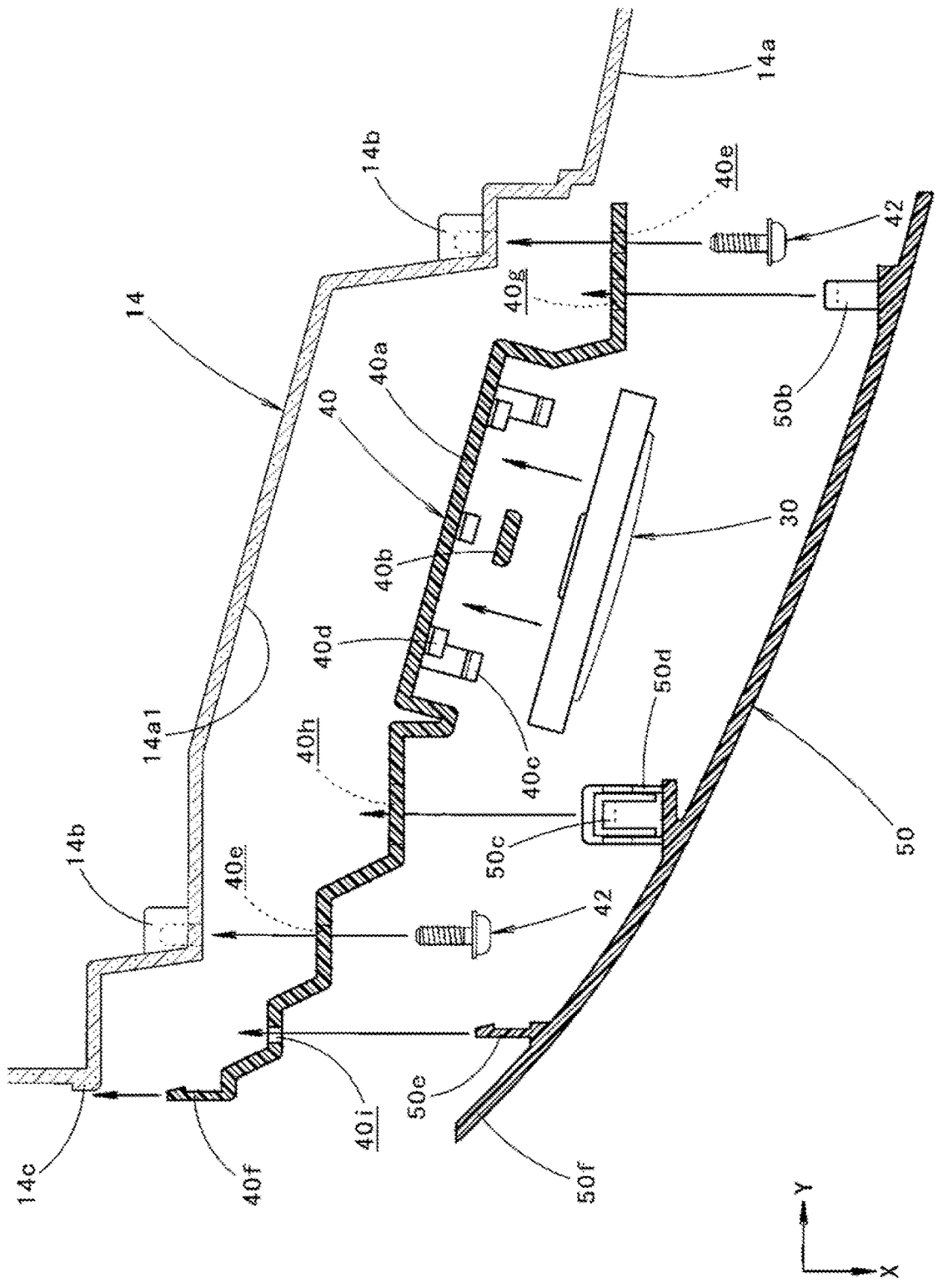
FIG. 6 is a diagram, similar to FIG. 3, that illustrates a state of assembly of the essential parts of the vehicle lamp.

FIGS. 5 and 6 are diagrams, similar to FIGS. 2 and 3, that illustrate a state of assembly of the essential parts of the vehicle lamp 10.

As illustrated in FIGS. 5 and 6, the millimeter wave radar 30 has a vertically long rectangular outer shape, and is positioned and held by an upper locking piece 40*b* and a pair of left and right lower locking pieces 40*c* in a state of being accommodated in a radar holding portion 40*a* formed in the holding bracket 40.

In the holding bracket 40, elastic pieces 40*d* extending upward are formed at three positions (specifically, two upper left and right positions and one lower center position) of the radar holding portion 40*a*. Each elastic piece 40*d* is formed by cutting and raising a part of the radar holding portion 40*a* toward the front side of the lamp. The three elastic pieces 40*d* elastically press a back surface of the millimeter wave radar 30 accommodated in the radar holding portion 40*a*, so that the millimeter wave radar 30 is reliably positioned and held by the upper locking piece 40*b* and the pair of left and right lower locking pieces 40*c*.

The millimeter wave radar 30 is attached to the holding bracket 40 by locking the lower end portion of the millimeter wave radar 30 to the pair of left and right lower locking pieces 40*c* of the holding bracket 40 in a state where the millimeter wave radar 30 is disposed in the radar holding portion 40*a* such that the back surface of the millimeter wave radar 30 is pressed against the three elastic pieces 40*d* after the upper end portion of the millimeter wave radar 30 is locked to the upper locking piece 40*b* of the holding bracket 40.

The holding bracket 40 is fixed to the outer lens 14 at four positions by screw fastening.

That is, screw insertion holes 40*e* are formed in the holding bracket 40 at four positions around the radar holding portion 40*a*, and boss portions 14*b* are formed in the outer lens 14 at positions corresponding to the four positions. The holding bracket 40 is fixed to the outer lens 14 by fastening screws 42 to the boss portions 14*b* through the screw insertion holes 40*e*.

A lance engagement piece 40*f* extending toward the rear side of the lamp is formed on an upper portion of an outer side end of the holding bracket 40 in the vehicle width direction. The lance engagement piece 40*f* extends along a vertical plane, and a tip end portion thereof protrudes inward in the vehicle width direction. On the other hand, a protrusion 14c for engaging with the tip end portion of the lance engagement piece 40f is formed at an outer side end of the outer lens 14 in the vehicle width direction. When the holding bracket 40 is screwed and fixed to the outer lens 14, the tip end portion of the lance engagement piece 40f is engaged with the protrusion 14c, thereby restricting displacement of the holding bracket 40 in a direction away from the outer lens 14 (that is, toward the front side of the lamp).

The radar cover 50 is fixed to the holding bracket 40 by lance engagement at the four positions.

That is, in the radar cover 50, claw portions 50b and 50c extending toward the rear side of the lamp are formed at the four positions positioned around the radar holding portion 40a of the holding bracket 40. In this case, the lower two claw portions 50c are formed in the lower region 50a of the radar cover 50. On the other hand, in the holding bracket 40, engagement holes 40g and 40h to be engaged with tip end portions of the claw portions 50b and 50c are formed at positions corresponding to the four positions.

Each of the four claw portions 50b and 50c is formed so as to extend along a horizontal plane, and a tip end portion thereof is formed downward. On the other hand, each of the four engagement holes 40g and 40h is formed in a horizontally long rectangular shape.

The engagement hole 40g of the four engagement holes 40g, 40h positioned at the upper portion on the inner side in the vehicle width direction is formed as a small horizontally long rectangular hole corresponding to the claw portion 50b to be engaged therewith. The remaining three engagement holes 40h are formed as horizontally long rectangular holes which are slightly larger than the claw portions 50c to be engaged therewith. An upright wall portion 50d which is to come into contact with the holding bracket 40 in a state of being fitted into the three engagement holes 40h is formed around the three claw portions 50c of the radar cover 50.

Figure 7A:
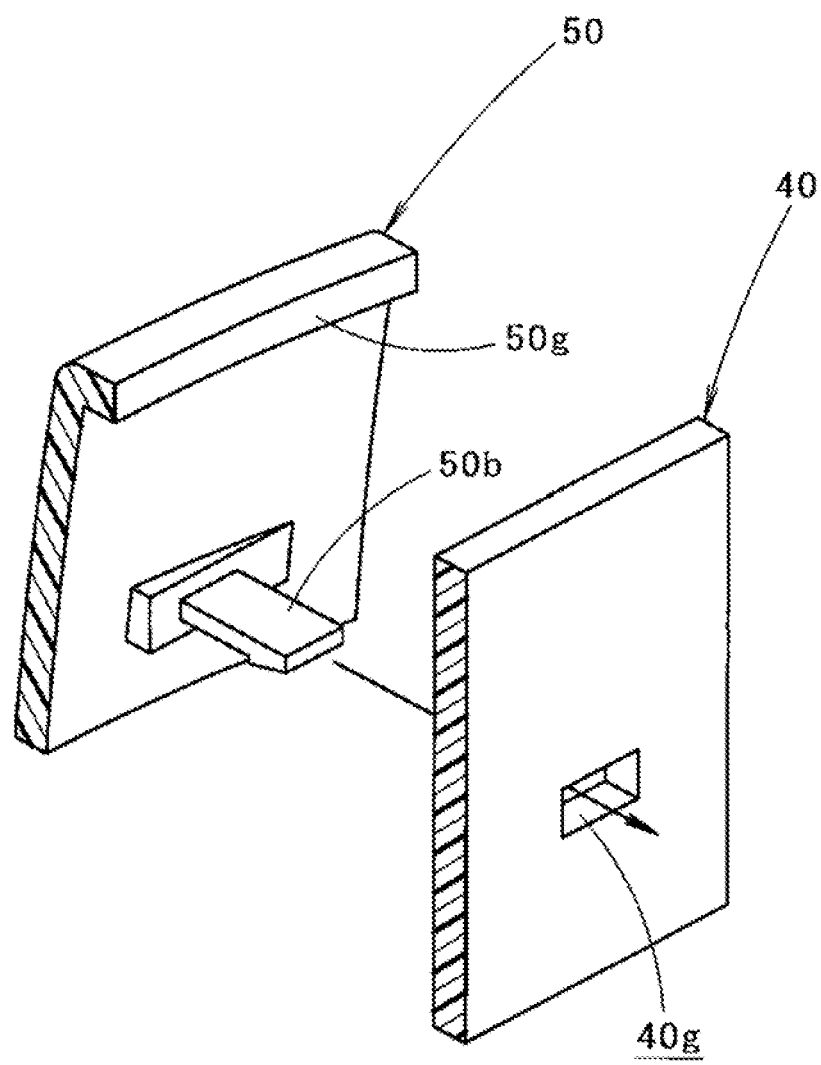
FIG. 7A is an exploded perspective view illustrating a VIIa portion in FIG. 4 in detail.
Figure 7B:
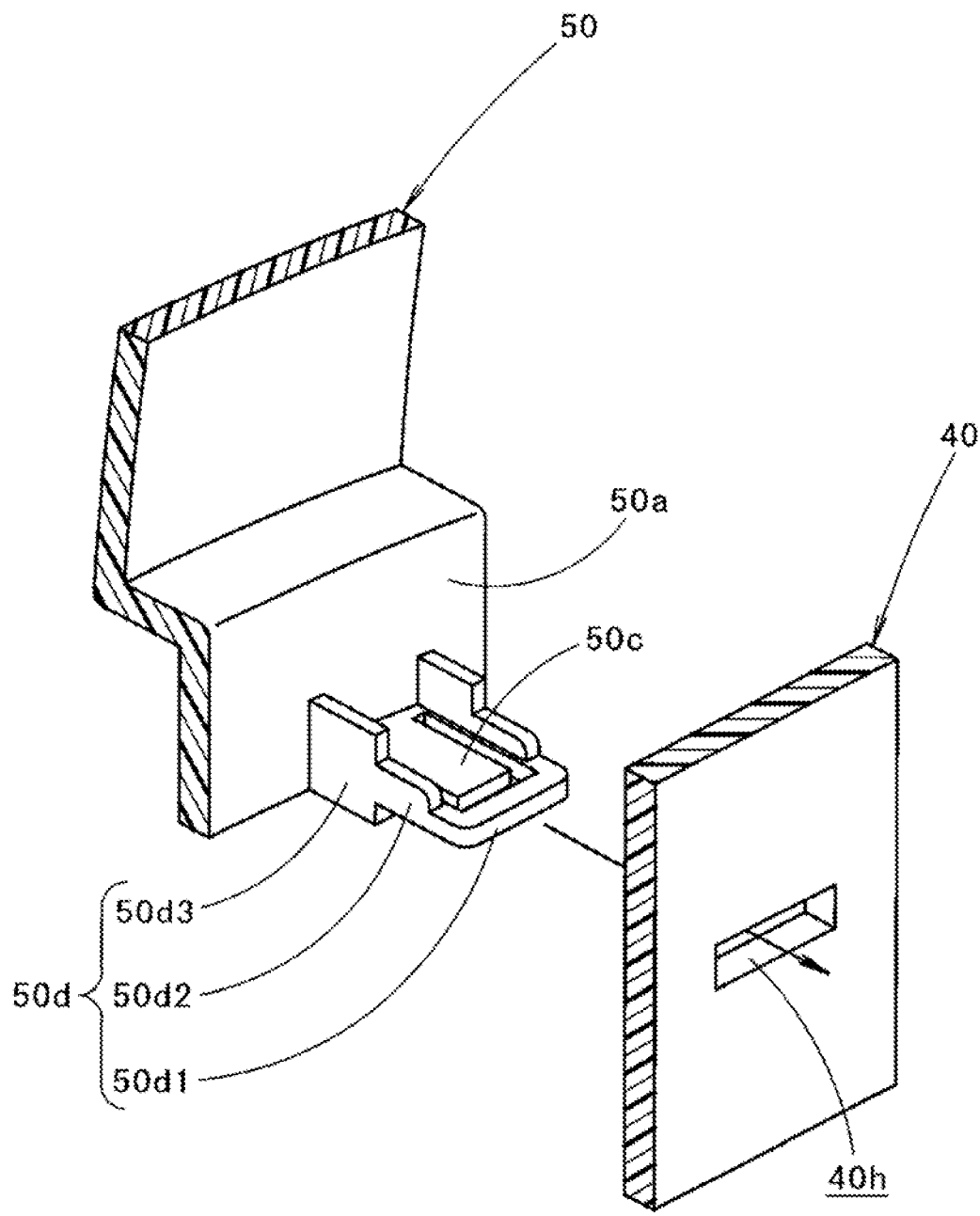
FIG. 7B is an exploded perspective view illustrating a VIIb portion in FIG. 4 in detail.

FIG. 7A is an exploded perspective view illustrating a VIIa portion in FIG. 4 in detail, and FIG. 7B is an exploded perspective view illustrating a VIIb portion in FIG. 4 in detail.

As illustrated in FIG. 7A, the engagement hole 40g is formed to have a left-right width slightly larger than that of the claw portion 50b to be engaged with the engagement hole 40g and a vertical width slightly larger than a maximum vertical width of the claw portion 50b. When the claw portion 50b of the radar cover 50 is engaged with the engagement
hole 40g, an upper end flange portion 50g of the radar cover 50 abuts against the holding bracket 40. Accordingly, the radar cover 50 is positioned relative to the holding bracket 40 in a front-rear direction of the lamp.

As illustrated in FIG. 7B, the engagement hole 40h is formed to have the same vertical width as the engagement hole 40g and a horizontal width larger than the engagement hole 40g.

The upright wall portion 50d includes a guide portion 50d1 formed so as to surround the claw portion 50c on the rear side of the lamp and both left and right sides thereof, first wall portions 50d2 formed on both left and right sides of the guide portion 50d1 and having a vertical width slightly smaller than that of the engagement hole 40h, and second wall portions 50d3 formed on the rear side of the lamp of the first wall portion 50d2 and having a vertical width larger than that of the engagement hole 40h. In a state where the guide portion 50d1 of the upright wall portion 50d is inserted into the engagement hole 40h, the pair of left and right first wall portions 50d2 are fitted into the engagement hole 40h, and the pair of left and right second wall portions 50d3 abut against the holding bracket 40 in a peripheral region of the engagement hole 40h. Accordingly, the radar cover 50 is positioned with respect to the holding bracket 40 in all directions (that is, the front-rear direction of the lamp and two directions orthogonal thereto).

As illustrated in FIGS. 3 and 5, a lance engagement piece 50e extending toward the rear side of the lamp is formed at an upper end portion of a portion of the radar cover 50 in a vicinity of an outer end portion in the vehicle width direction (that is, a position on an outer peripheral side of the outer lens 14 with respect to a fixing position between the holding bracket 40 and the outer lens 14 on the radar cover 50). On the other hand, a lance engagement hole 40i to be engaged with a tip end portion of the lance engagement piece 50e is formed at the upper end portion of the portion of the holding bracket 40 in the vicinity of the outer end portion in the vehicle width direction. The lance engagement hole 40i is positioned on the inner side in the vehicle width direction with respect to the lance engagement piece 40f, but is positioned on the outer side in the vehicle width direction with respect to the screw insertion hole 40f. When the radar cover 50 is engaged and fixed to the holding bracket 40 at the four positions, the tip end portion of the lance engagement piece 50e is engaged with the lance engagement hole 40i, thereby restricting the radar cover 50 from being displaced in a direction away from the holding bracket 40 (that is, toward the front side of the lamp).

As described above, in the present embodiment, the lance engagement piece 40f of the holding bracket 40 is engaged with the protrusion 14c of the outer lens 14, and the lance engagement piece 50e of the radar cover 50 is engaged with the lance engagement hole 40i of the holding bracket 40 (corresponds to a displacement prevention structure). Accordingly, a displacement prevention structure that prevents the radar cover 50 from being displaced in the direction away from the outer lens 14 is provided at a position on the outer side in the vehicle width direction of a fixing position between the holding bracket 40 and the outer lens 14.

Next, operations and effects of the present embodiment will be described.

The vehicle lamp 10 according to the present embodiment has a configuration in which the millimeter wave radar 30 is disposed on the outer surface 14a side (that is, the front side of the lamp) of the outer lens 14 covering the lamp chamber 16, and may have a configuration including the holding bracket 40 for holding the millimeter wave radar 30 and the radar cover 50 for covering the millimeter wave radar 30, based on the above, the holding bracket 40 is fixed to the outer lens 14 in a state of holding the millimeter wave radar 30, and the radar cover 50 is fixed to the holding bracket 40 in a state of covering the millimeter wave radar 30. Therefore, the following effects can be obtained.

That is, since the holding bracket 40 is fixed to the outer lens 14 and the radar cover 50 is fixed to the holding bracket 40, it is not necessary to provide a structure for fixing the millimeter wave radar 30 and the radar cover 50 to the outer lens 14. Accordingly, it is possible to prevent the outer lens 14 from having a complicated shape.

As described above, according to the present embodiment, in the vehicle lamp 10 in which the millimeter wave radar 30 is disposed, the millimeter wave radar 30 and the radar cover 50 can be fixed to the outer lens 14 without forming the outer lens 14 into a complicated shape. Accordingly, it is possible to more easily ensure molding quality of the outer lens 14.

In the present embodiment, the recess portion 14a1 is formed in the outer surface 14a of the outer lens 14, and a part of the millimeter wave radar 30 is accommodated in the recess portion 14a1. Accordingly, since the radar cover 50 is disposed to be flush with the outer lens 14, design of the vehicle lamp 10 can be sufficiently improved.

In addition, in the present embodiment, the configuration of the radar cover 50 can be simplified since the claw portions 50b and 50c are formed at the four positions of the radar cover 50, and the engagement holes 40g and 40h to be engaged with the claw portions 50b and 50c are formed at the four positions of the holding bracket 40. Accordingly, assembling work of the vehicle lamp 10 can be easily performed, and the design of the vehicle lamp 10 can be improved as compared with a case where screw fastening or the like is adopted.

At this time, since the upright wall portion 50d that abuts against the holding bracket 40 in a state of being fitted into the engagement hole 40h is formed around the three claw portions 50c of the four claw portions 50b and 50c, the positioning of the radar cover 50 can be reliably performed.

Further, in the present embodiment, as a displacement prevention structure for preventing the radar cover 50 from being displaced in the direction away from the outer lens 14, a configuration in which the radar cover 50 and the holding bracket 40 are engaged with each other and the holding bracket 40 and the outer lens 14 are engaged with each other is provided at a position on the outer side in the vehicle width direction (that is, the outer peripheral side of the outer lens 14) with respect to the fixing position between the holding bracket 40 and the outer lens 14. Therefore, it is possible to prevent the outer peripheral edge portion 50f of the radar cover 50 from being lifted from an original position in advance. Accordingly, it is possible to maintain a state in which the radar cover 50 is disposed on the outer peripheral edge portion 50f so as to extend to be flush with the bumper cover 106.

In addition, as in the present embodiment, the above displacement prevention structure is implemented by the engagement between the radar cover 50 and the holding bracket 40 and the engagement between the holding bracket 40 and the outer lens 14. As a result, it is possible to prevent the outer peripheral edge portion 50f of the radar cover 50 from being lifted in advance by a simple and easy configuration.

In the above embodiment, the recess portion 14a1 of the outer lens 14 that is formed to accommodate a part of the millimeter wave radar 30 is described, but the millimeter wave radar 30 may be formed to accommodate the entire millimeter wave radar 30.

In the above embodiment, the claw portions 50b and 50c that are formed at four positions of the radar cover 50 and the engagement holes 40g and 40h that are formed at four positions of the holding bracket 40 are described, but it is also possible to adopt a configuration in which the claw portion and the engagement hole are formed at two positions, three positions, or five or more positions.

In the above embodiment, the displacement prevention structure for preventing the radar cover 50 from being displaced in the direction away from the outer lens 14 is implemented by the engagement between the radar cover 50 and the holding bracket 40 and the engagement between the holding bracket 40 and the outer lens 14, but the displacement prevention structure may be implemented only by the engagement between the radar cover 50 and the holding bracket 40, or only by the engagement between the holding bracket 40 and the outer lens 14. Even in the case where such a configuration is adopted, it is possible to restrict the occurrence of lifting of the outer peripheral edge portion 50f of the radar cover 50.

In this case, the displacement prevention structure may be formed such that a pin extending toward the rear side of the lamp is formed in the radar cover 50 instead of the lance engagement piece 50e, and a pin insertion hole through which the pin is inserted is formed in the holding bracket 40 instead of the lance engagement hole 40i. Accordingly, when the outer peripheral edge portion 50f of the radar cover 50 is lifted from the original position, the pin abuts against an inner peripheral surface of the pin insertion hole, thereby restricting the lifting.

In the above embodiment, the radar cover 50 and the holding bracket 40 are fixed to each other by engaging the claw portions 50b and 50c with the engagement holes 40g and 40h at four positions. Other fixing structures (for example, screw fixing, clip fixing, adhesive fixing, and the like) can also be adopted.

In the above embodiment, the vehicle lamp 10 is described as a headlamp, but even in a case where the vehicle lamp 10 is a lamp other than the headlamp (for example, a rear combination lamp or the like), it is possible to obtain the same effect as the above embodiment by adopting the same configuration as the above embodiment.

It should be noted that numerical values illustrated as specifications in the above embodiment are merely examples, and as a matter of course, these numerical values may be set to different values as appropriate.

Further, the invention is not limited to the configurations described in the above embodiment, and a configuration added with various other changes may be adopted.

The invention claimed is:

1. A vehicle lamp in which a millimeter wave radar is disposed on an outer surface side of an outer lens covering a lamp chamber, comprising:
    a holding bracket configured to hold the millimeter wave radar; and
    a radar cover configured to cover the millimeter wave radar, wherein
    the holding bracket is fixed to the outer lens in a state of holding the millimeter wave radar, and
    the radar cover is directly fixed to the holding bracket in a state of covering the millimeter wave radar.

2. The vehicle lamp according to claim 1, wherein
    a recess portion is formed on an outer surface of the outer lens, and
    the millimeter wave radar is accommodated in the recess portion.

3. The vehicle lamp according to claim 1, wherein
    a claw portion is formed at a plurality of positions of the radar cover, and
    an engagement hole to be engaged with the claw portion is formed at a plurality of positions of the holding bracket.

4. The vehicle lamp according to claim 3, wherein
    an upright wall portion that abuts against the holding bracket in a state of being fitted into the engagement hole is formed around at least one claw portion of the claw portions at the plurality of positions.

5. The vehicle lamp according to claim 1, wherein
    a displacement prevention structure that prevents the radar cover from being displaced in a direction away from the outer lens is provided at a position on an outer peripheral side of the outer lens with respect to a fixing position between the holding bracket and the outer lens.

6. The vehicle lamp according to claim 5, wherein the displacement prevention structure is formed by engagement between the radar cover and the holding bracket and/or engagement between the holding bracket and the outer lens.

* * * * *